July 23, 1935.   W. K. SKOLFIELD   2,009,124
SPRING THRUST WASHER
Filed Oct. 7, 1933

Inventor:
William K. Skolfield,
by Harry E. Dunham
His Attorney.

Patented July 23, 1935

2,009,124

UNITED STATES PATENT OFFICE 2,009,124

SPRING THRUST WASHER

William K. Skolfield, Bridgeport, Conn., assignor to General Electric Company, a corporation of New York Application October 7, 1933, Serial No. 692,642

4 Claims. (Cl. 308—163)

The present invention relates to spring thrust washers for cushioning the end thrusts of relatively small rotating shafts. The invention is well adapted for use in connection with small electric motors, and especially electric motors for electric fans, and accordingly I have elected to illustrate this use of my invention. It is to be understood, however, that the invention is not limited necessarily thereto.

In the operation of electric fans, quietness is of primary importance and if end play exists between the thrust shoulders on the motor shaft and the stationary thrust shoulders, the rotor may play back and forth in its bearings giving rise to a knocking or thumping sound.

The object of the present invention is to provide an improved spring thrust washer which is simple in structure, efficient in operation, and capable of being manufactured at low cost, and for a consideration of what I believe to be novel and my invention, attention is directed to the accompanying description and the claims appended thereto.

Figure 1:
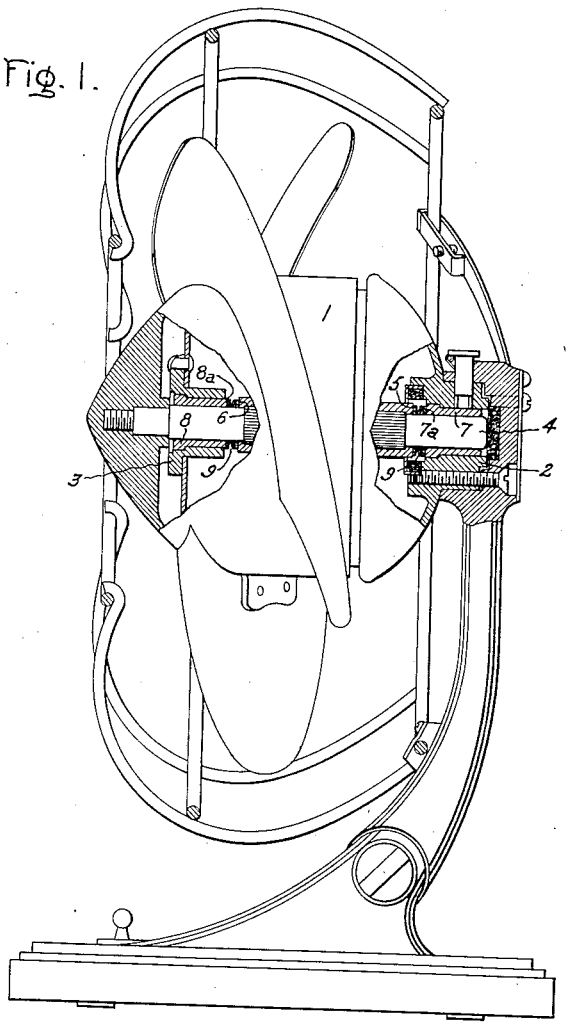
Figure 2:
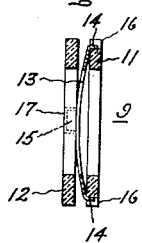

In the drawing, Fig. 1 shows an electric fan motor, partly in section, provided with spring thrust washers embodying the invention; Fig. 2 is a sectional view of one of the washers, and Fig. 3 is a perspective exploded view showing the several parts of the washer.

Referring to the drawing, I indicates an electric motor, the housing of which is provided with bearings 2 and 3, supported in the frame of the fan structure. The armature shaft 4 is provided with thrust shoulders 5 and 6. It is journaled in bearing linings 7 and 8 carried by the bearings 2 and 3. The ends of bearing linings 7 and 8 provide stationary thrust shoulders 7ª and 8ª. My invention relates particularly to spring thrust washers located between the thrust shoulders 5 and 6 on the shaft and the stationary thrust shoulders 7ª and 8ª for taking up end play of the shaft.

Figure 3:
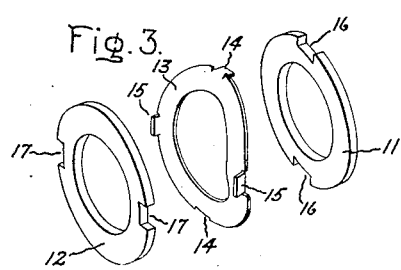

Referring particularly to Figs. 2 and 3, the spring thrust washer, indicated as a whole at 9, comprises three pieces, two wear rings or discs 11 and 12 and a spring ring or disc 13. The wear rings 11 and 12 are formed from a suitable material capable of withstanding wear and which is not affected adversely by moisture. Preferably, I employ a non-metallic material such as spinable textile fibres united and held in a highly compressed state by an artificial resin such as a phenolic condensation product. Such a material is highly resistant to wear, will not absorb moisture, swell or shrink, and is relatively low in cost.

The spring ring 13, which is interposed between the two wear rings 11 and 12, comprises a suitable piece of spring metal which is bent in opposite directions along diameters placed 90° apart as best shown in Fig. 3 so as to provide a spring structure capable of yielding in an axial direction. Preferably, I construct ring 13 from phospher bronze.

The wear rings 11 and 12 and the spring ring 13 are connected together by sliding connections so arranged that while the rings may move axially relatively to each other, they cannot turn relatively to each other. To this end, I provide spring ring 13 with pairs of oppositely facing, axially extending ears 14 and 15 and the wear rings 11 and 12 with recesses 16 and 17 respectively into which the ears extend with a sliding fit. By means of these ears and recesses, the resilient spring ring and the wear rings are held from turning relatively to each other so there can be no friction or wear between them. At the same time, however, they may move axially relatively to each other, the spring ring 13 being compressed between the wear rings 11 and 12. As shown in Figs. 2 and 3, the ears 15 which engage the recesses 17 of ring 12 are on one of the diameters along which the spring ring 13 is bent and the ears 14 which engage recesses 16 are on the other diameter along which the spring ring 13 is bent.

The three rings are assembled relatively to each other as shown in Fig. 2 to form an axially yieldable washer and the washers are mounted on the motor shaft 4 between the respective thrust shoulders. The openings through the washers are slightly larger than the diameter of shaft 4 so that the shaft may turn freely within the washers. With this arrangement, the washers float on the shaft and may turn with the shaft or remain stationary, depending on the operating conditions obtaining at the moment. In either case, the washers serve to take up the end play between the shoulders on the shaft and the adjacent shoulders at the end of the bearing linings so as to cushion any back and forth movement or knocking of the shaft. The axially yielding spring rings 13 serve to expand the washers to take up for wear.

By my invention, it will be seen that the parts of the washer which are in contact with the thrust shoulders are formed of a material capable of withstanding wear so that the washers will have a long life. At the same time, I provide between the wear rings a resilient means for expanding the washer in an axial direction which resilient means is not subjected to wear of any kind so that it may be chosen for its ability as a spring member. As the wear rings 11 and 12 are worn away, the spring ring expands, maintaining practically constant pressure and cushioning. This is an important consideration and I have found in actual practice that my improved spring thrust washer will maintain this condition even after there has occurred extreme wear on the washer.

What I claim as new and desire to secure by Letters Patent of the United States, is,—

1. A spring thrust washer for use between a thrust shoulder on a rotating shaft and an adjacent stationary thrust shoulder comprising a plurality of wear rings, axially yieldable spring means separating said rings, and means fastening said rings and spring means together to prevent rotation of the rings and spring means relatively to each other but permit them to move axially relatively to each other.

2. A spring thrust washer for use between a thrust shoulder on a rotating shaft and an adjacent stationary thrust shoulder, comprising a plurality of wear rings, an axially yieldable spring ring located between them, and means fastening said rings together to prevent rotation of the rings relatively to each other but permit them to move axially relatively to each other.

3. A spring thrust washer for use between a thrust shoulder on a rotating shaft and an adjacent stationary thrust shoulder comprising a plurality of wear rings, an axially yieldable spring ring located between them, and interengaging parts on said rings which prevent rotation of said rings relatively to each other but permit them to move axially relatively to each other.

4. A spring thrust washer comprising in combination wear rings having recesses on the peripheries thereof, and an axially yieldable resilient ring interposed between said wear rings, said resilient ring having ears on the periphery thereof which engage the recesses of the said wear rings.

WILLIAM K. SKOLFIELD.